United States Patent [19]

Tacquard et al.

[11] Patent Number: 4,976,620
[45] Date of Patent: Dec. 11, 1990

[54] DEVICE FOR CREATING AND DISPLAYING MOIRE PATTERNS

[75] Inventors: Timothy L. Tacquard; Patricia B. Gillfillan, both of Laguna Nigel, Calif.

[73] Assignee: Patail Enterprises, Inc., Laguna Niguel, Calif.

[21] Appl. No.: 350,255

[22] Filed: May 11, 1989

[51] Int. Cl.⁵ .............................................. G09B 19/00
[52] U.S. Cl. ........................................ 434/81; 434/87
[58] Field of Search .................... 40/436, 437; 434/81, 434/87, 88, 91, 92, 85, 96, 98, 211, 300, 303; D19/59, 62; 273/155; 428/30

[56] References Cited

U.S. PATENT DOCUMENTS

| | | | |
|---|---|---|---|
| 2,528,765 | 1/1947 | Lindberg | 434/87 |
| 3,061,946 | 11/1962 | Carty | 434/87 |
| 3,235,987 | 2/1966 | Yates | 40/437 |
| 3,272,506 | 9/1966 | Lescher | 434/101 X |
| 3,370,371 | 8/1966 | Swarbrick | 40/437 X |
| 3,562,941 | 7/1968 | Boden | 40/437 |
| 3,745,966 | 7/1973 | Seager | 40/437 X |
| 3,811,213 | 5/1974 | Eaves | 40/437 |
| 3,972,319 | 1/1976 | Dehlinger | 128/76.5 X |
| 4,399,353 | 8/1983 | Adkins et al. | 434/102 X |

FOREIGN PATENT DOCUMENTS

| | | | |
|---|---|---|---|
| 21058 | of 1890 | United Kingdom | 40/437 |
| 8250 | of 1897 | United Kingdom | 40/427 |

Primary Examiner—Richard J. Apley
Assistant Examiner—Rachel M. Healey
Attorney, Agent, or Firm—Stetina and Brunda

[57] ABSTRACT

A device comprising a base plate having a first array of lines displayed on the upper surface thereof and at least one generally transparent upper plate member having at least a second array of lines marked thereon. The upper plate member(s) are juxtapositionable and rotationally movable over the base plate such that the arrays of lines present on the upper plate member(s) will interact with each other and/or the array of lines present on the base plate to create a variety of moire patterns. Some or all of the base plate and upper plate members may be pre-marked with desired linear arrays. Alternatively, some or all of the base plate and/or upper plate members may be provided in blank unmarked form to permit the user to draw his own linear arrays thereon so as to design the create unique moire patterns. A line drawing template may also be provided to assist the user in drawing the arrays of lines on the upper and/or base plates.

1 Claim, 2 Drawing Sheets

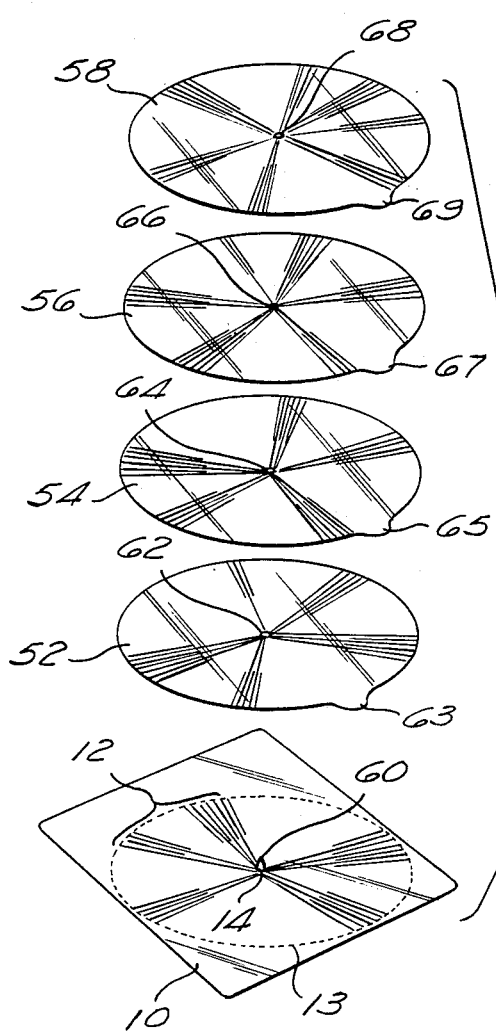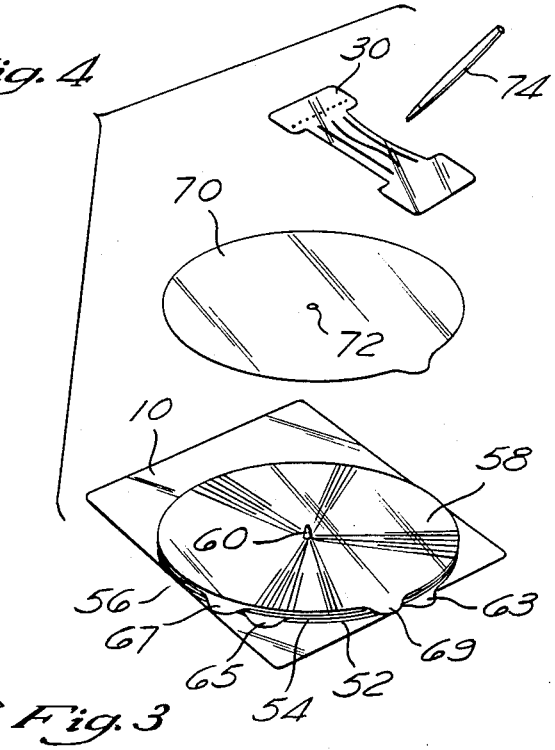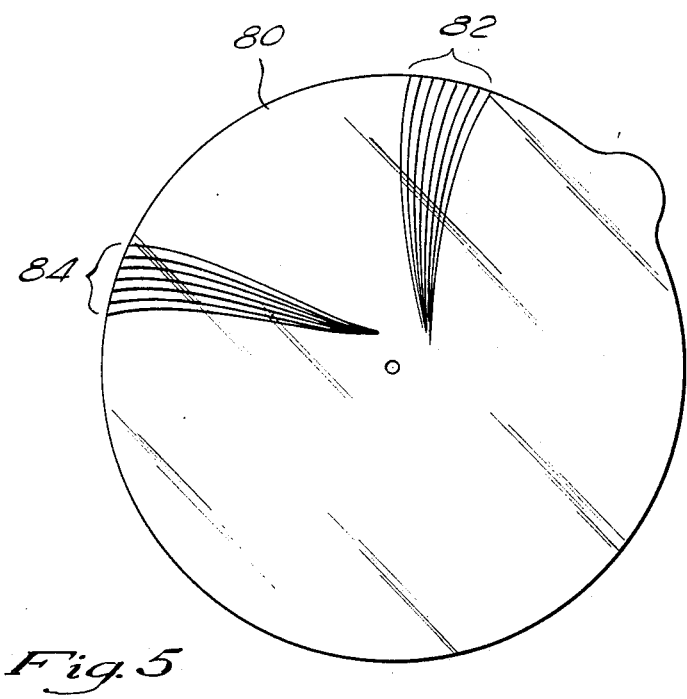

DEVICE FOR CREATING AND DISPLAYING MOIRE PATTERNS

BACKGROUND OF THE INVENTION

This application pertains generally to visual arts and more particularly to a device for creating and demonstrating moire patterns.

A moire pattern is a shimmering pattern which is formed when two or more geometrically regular patterns are superimposed upon one another, especially at acute angles.

Because each moire pattern is substantially unique, it is difficult to sketch or verbally describe the appearance of such patterns for teaching or demonstration purposes. Thus, there exists a need for a simple and inexpensive device which is capable of creating and visually displaying moire patterns for purposes of education as well as entertainment.

The present invention provides one such device which may be used to create and visually display moire patterns.

BRIEF SUMMARY OF THE INVENTION

In accordance with the invention, there is provided a device for creating and demonstrating moire patterns. The device of the present invention comprises a base plate having an array of lines on the upper surface thereof and at least one generally transparent upper plate having a similar array of lines displayed thereon. The upper plates are then horizontally juxtapositioned over top of the lower plate such that respective rotational pivot points of the line arrays present on the upper and lower plates are coaxially aligned with one another. Thereafter, as the upper and/or lower plates are rotated about such points, shimmering moire patterns will appear due to the superimposition and interaction of the upper and lower plate line arrays.

In accordance with a further aspect of the invention, multiple upper plates with differing shapes, sizes and colors of lines may be employed so that, when all of the plates are juxtapositioned, i.e. overlayed upon one another, and rotated in the foregoing manner, the line arrays of the upper and lower plates will interact to form unique and complex and/or multicolored moire patterns.

Further in accordance with the present invention, the line arrays of the base plate and each of the above-positioned upper plate members may include straight lines, bowed lines, sinusoidal lines and/or sigmoidal lines in various combinations thereof, so as to create varied and unique moire patterns.

In accordance with a still further aspect of the invention, the upper plate members and/or base plate may be premarked with desired linear arrays. Alternatively, some or all of the upper plate members may be provided in a blank unmarked condition so as to permit the user to design and create his own unique moire pattern. Also, there may be provided a template for drawing various lines, (e.g. straight, bowed, sinusoidal and/or sigmoidal lines) on the previously unmarked upper plates of the invention so as to permit the user to independently create unique moire patterns through use of the drawing template in conjunction with the device of the present invention. Also, to facilitate the use of such drawing template, the base plate and or upper plates of the present invention may be formed of a non-porous plastic or similar material upon which the desired lines may be easily marked using a standard felt tipped pen while permitting such line to be subsequently wiped away by a dry cloth or a solvent/water dampened cloth hereby preparing the plate member for reuse.

In accordance with an even further aspect of the invention, the upper plate member(s) of the device may be provided with one or more actuation lugs extending from an outer edge thereof to provide a convenient means of grasping and rotating the upper plate member(s) without bending such plate member(s) or fingering and possibly smudging the surface of such plate member(s) upon which the array of lines is drawn.

A principal object of the invention is to provide a device for creating, forming and displaying moire patterns.

A further object of the invention is to provide a kit for creating unique linear arrays which, when superimposed upon one another and rotationally manipulated by the device of the present invention, will create unique, and dynamically shimmering moire patterns.

An even further object of the invention is to provide a demonstrative teaching tool for creating and exhibiting moire patterns and/or related visual phenomena.

Further objects and advantages of the invention will become apparent to those skilled in the art upon reading and understanding of the following detailed description of a preferred embodiment and upon consideration of the accompanying drawings.

BRIEF DESCRIPTION OF THE DRAWINGS

FIG. 3 is an exploded perspective view of a preferred device of the present invention.

FIG. 4 is a partially assembled perspective view of a preferred device of the present invention, including a line drawing template and writing utensil for marking the desired line arrays on the various upper and lower plate members of the device.

FIG. 5 is a plan view of an exemplary upper plate member which forms a part of the device of the present invention.

DETAILED DESCRIPTION OF A PREFERRED EMBODIMENT

Figure 1:
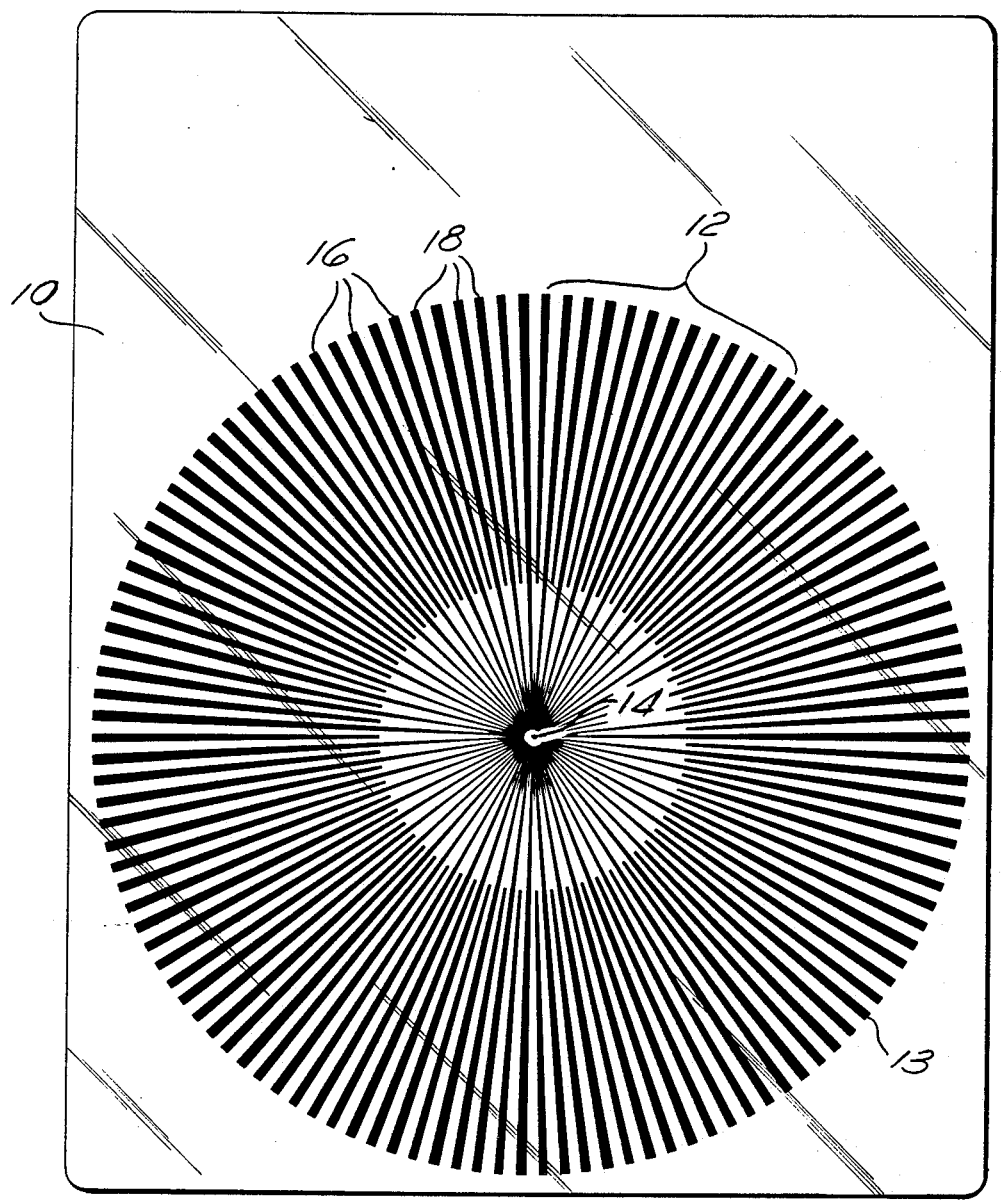
FIG. 1 is a planned view of a rectangular base plate of the present invention having a radial linear array provided thereon.

Referring now to the drawings wherein showings are for the purposes of illustrating a preferred embodiment of the invention and not for purposes of limiting the same, FIG. 1 is a top plan view of an exemplary base plate 10 of the present invention. The lines which form the array 12 on the base plate 10 comprise radial lines which extend fully from the center point to the outer circumference 13 of the array. Interpositioned between such radial lines are partial radial lines 18 which originate at points radially outward of the center point of the circular array and extend outwardly therefrom to the outer circumference 13 of the array. Because the partial radial lines 18 do not extend fully inward to the center point 14 of the radial array 12 their presence within the array creates a visually discernible inner ring within the central region of the radial array 12.

Also, as shown in FIG. 1, the full and partial radial lines 16, 18 of the base plate 10 become progressivly wider as they extend outwardly toward the circumerential boarders of the array. Such progressive widening of the individual lines 16, 18 as they extend outwardly within the circular array 12 lends an exagerated spoke-like appearance to the outer periphery of the radial array 12.

Preferably, a plurality of rotatable upper plate members 52, 54, 56, 58 as shown in FIG. 3, will be juxtapositionally stacked, i.e. overlayed, on top of the base plate 10 and subsequently rotated to create the desired moire patterns. In the preferred embodiment a number of such upper plate members will bear permanent radial arrays identical in configuration to that of the base plate but differeing in color so as to create multicolored moire patterns. For example, the array marked on the base plate may be black in color while the permanently marked upper plate member may bear arrays which are blue, green, red, yellow, etc.

In addition to the permanently marked upper plate members 52, 54, 56, 58 the preferred embodiment may include one or more blank or unmarked upper plate members 70 upon which the user may draw his own array(s) of lines to create new and unique moire patterns.

Figure 2:
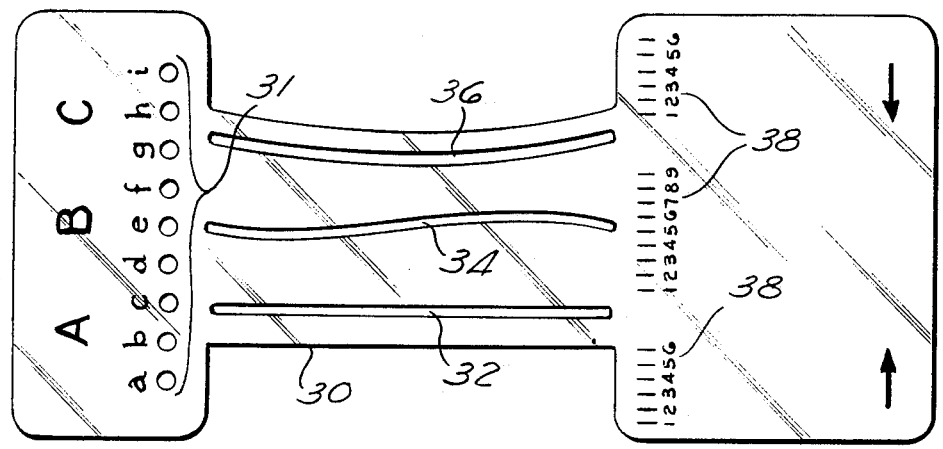
FIG. 2 is a plan view of the line-drawing template which forms a part of the present invention and is provided for use in drawing various lines on the various upper plate members and/or base plate of the invention.

FIG. 2 shows a prefered template to be used for drawing the desired lines on the blank upper plate members of the present invention. The template 30 is provided with individual alignment holes 31 (labled a through i) at the top thereof. Each such hole 31 may be selectively snapped over a vertical alignment post which preferably extends upwardly from the center of the base plate and serves as a rotational pivot point for the various upper plate members. After the appropriate alignment hole 31 is snapped over the vertical alignment post (not shown) an erasable felt tip pen or other type of inkpen may be used to draw straight lines, sigmoidal lines or bowed lines using each of the linear template grooves 32, 34 and 36 respectively. A spacing gauge 38, is positioned at the bottom of the template to assist the user in maintaining desired spacing between lines. The template is composed of a transparent plastic which permits the user to see through the body of the template thereby enabling the user to easily utilize the gauge markings 38 for purposes of spacing the distance between the line presently being drawn and those which had previously been drawn.

FIGS. 3 and 4 indicate the manner in which the base plate 10 and the rotatable upper plate members 52, 54, 56, 58 and/or 70 may be horizontally juxtapositioned to create a composite moire image. When placed in juxtaposition and rotated while looking downwardly through each of the transparent upper panels 52, 54, 56, 58 and 70 the line arrays present on the upper panels as well as the line array of the base plate 10 will interact to create such moire patterns.

Grasping lugs 63, 65, 67, 69 are formed on the outer edges of the upper plate members 52, 54, 56, 58 to assist the user in grasping and rotating the plates when in use.

The manner in which the juxtapositioned upper plate members 52, 54, 56 and 58 may be stacked and rotatably positioned upon the base plate 10 is represented in FIG. 4. Specifically referring to FIG. 4, the rotatable upper panels 52, 54, 56 and 58 are horizontally stacked on top of base plate 10. The vertical center post 60 which extends perpendicularly from the center point of base member 10 extends through the central apertures of each of the upper plate members 52, 54, 56 and 58 such that the pointed upper tip thereof protrudes slightly above the top surface of the upper most panel member 58.

In FIG. 4, a uniquely marked fifth upper plate member 70 is positioned above the device. Such additional upper plate member 70 may be stacked on top of the four previously stacked upper plate members 52, 54, 56 and 58 by simply snapping the pointed center alignment pin 60 upwardly through the central aperture 72 the of additional upper plate member 70.

Positioned above additional fifth upper plate member 70 is the designers template 30 of the present invention with a felt tipped ink marker 74 shown in conjunction therewith. It is to be appreciated that the template 30 may be independently positioned over any one of the transparent rotatable upper panels 52, 54, 56 and 58 or 70 and used to draw thereon a desired array of linear, bowed and/or sigmoidal lines. Presumably the user of the device will position each individual upper plate member 52, 54, 56, 58 or 70, one at a time, on the base plate 10 such that the vertical alingment post 60 of base plate 10 will extend through each central aperture 62, 64, 66, 68 or 72 of each upper plate member 52, 54, 56, 58 or 70. Following placement of each upper plate member 52, 54, 56, 58 or 70 a desired one of the positioning apertures 31 of the line drawing template 30 will be snapped over the tip of the vertical alignment post 60 so as to pivotally hold the template 30 in position on the upper surface of the underlying upper plate member 52, 54, 56, 58 or 70. Thereafter, the tip of a pen will be applied through the slit-like template grooves 32, 34, or 36 so as to form the desired linear marking on the upper surface of the underlying plate member 52, 54, 56 58, or 70. The template 30 will then be incrementally pivotally moved about the vertical alingment post 60 to permit the user to draw an array of lines about a common central point.

The spacing between the lines drawn using template 30 may be gauged by gauging means 38.

After one of the upper plate members has been marked with the desired linear array, a blank sheet of opaque paper may be placed on top thereof and a second upper plate member (ex 54) may be positioned horizontally on top thereof by snapping the central aperture (ex 64) over the protruding upper end of vertical alignment post 60. The above described process of drawing a desired linear array using the template 30 will then be repeated. This process may be serially repeated for virtually any number of upper plate members, with the linear array on each upper plate member varrying in accordance with the wishes and creative inclinations of the user. After the desired linear arrays have been drawn on the desired number of upper plate members the blank sheets of paper may then be removed and discarded. Upon removal of the opaque sheets of paper, the user will be permitted to peer downwardly through each of the transparent upper plate members 52, 54, 56, 58 and/or 70 to the base plate 10 As the upper plate members 52, 54, 56, 58 and/or 70 are individually or simultaneously rotated, unique shimmering moire pattern will be observed by the user as a result of the interaction between the individual lines of the linear arrays of the upper plate members and the base plate 10.

Of course, any combination of uniquely marked and permanently marked upper plate members may be used. For example, the user may initially employ only the permanently marked upper plate members 52, 54, 56, 58 to generate standard, multicolored moire patterns. Thereafter, the user may wish to combine one or more upper plate members upon which he has drawn his own unique linear arrays with the existing standard patterns. Finally, the user may choose to use all upper plate members bearing unique user-created linear arrays and none of the permanently marked standard plate memebers 52, 54, 56, 58.

It is by the above described structure and method that the device of the present invention provides a means for creating and demonstrating shimmering moire patterns. As a practical matter, the device, including (a) the base plate, (b) a plurality of permanently marked upper plate members bearing radial arrays similar or identical to that of the base plate, (c) one or more unmarked upper plate members and (d) a line-drawing template for marking unique arrays on the unmarked plate member may be packaged and sold in kit form. Preferably, such kit will include a plurality of upper plate members which bear premarked arrays of lines as well as several of the unmarked upper plate members upon which the user may draw any desired array of lines to create individually unique moire patterns.

Of course, different colors of ink, different types and sizes of drawing instruments/markers, and various other means may be employed to vary the type, size and color of the appearance of the linear arrays on each of the upper plate members 52, 54, 56, 58 and/or 70. These various options provide the user an extreme degree of flexibility in creating truly unique and novel moire patterns.

It must be appreciated that, although the invention has been described herein with reference to a preferred embodiment, many variations and modifications may be made to such preferred embodiment without deviating from the spirt and scope of the present invention. It is, thus, intended that all such modifications and variations be included within the scope of the attended claims and the equivalence thereof.

Having thusly described the invention, what is claimed is:

1. A device for creating and displaying moire patterns, said device consisting essentially of:
   a base plate having an upper surface with a circular array of radially extending lines formed thereupon, said array having a center point and an outer circumferential edge, said the lines of the array emanating from the center point and extending outwardly to the outer circumferential edge thereof;
   a plurality of partial lines which extend from points lying outside the center point of the array, said points being substantially equidistant from said center point, said partial lines terminating peripherally at the outer circumferential edge thereof;
   at least one generally transparent upper plate member having at least a second array of lines marked thereon; and
   said upper plate member being juxtaposable and rotationally moveable over the upper surface of said base plate such that the arrays of the lines present on said upper plate member(s) and said base plate will interact to form at least one moire pattern;
   wherein said radially extending lines and said partial lines become progressively wider as they extend outwardly toward the outer circumferential edge of the array.

2. The device of claim 1 wherein said generally transparent upper plate member(s) comprises a round plastic disk.

3. The device of claim 1 wherein said base plate further comprises an alignment post which extends perpendicularly from the upper surface thereof and said upper plate members are provided with alignment apertures sized and configured to be slidably advanced over said alignment post so as to hold said upper plate member(s) in horizontal juxtaposition on the upper surface of said base plate.

4. The device of claim 1 wherein said upper plate member(s) is proved with a grasping lug which extends from an outer edge thereof to facilitate gripping and manual rotation of the upper plate member.

5. The device of claim 1 including a line drawing template having at least one generally linear groove aperture extending therethrough, said template being selectively positionable over said base plate and said upper plate member(s) such that the said linear groove of the template may be utilized as a guide for the drawing of a corresponding line on a surface of said selected plate.

6. The device of claim 5 wherein said template is further provided with a gauging means which is operative to assist the user in gauging the distance between a line presently being drawn through the slit aperture and any previously drawn lines marked on the selected surface.

7. A kit for creating and displaying moire patterns, said kit consisting essentially of:
   a base plate having an upper surface with a circular array of radially extending lines formed thereupon, said array having a center point and an outer circumferential edge, with the lines of the array emanating from the center point and extending outwardly to the outer circumferential edge thereof;
   a plurality of partial lines which extend from points lying outside the center point of the array, said points being substantially equidistant from said center point, said partial lines terminating peripherally at the outer circumferential edge thereof;
   a plurality of generally transparent upper plate members having arrays of lines marked thereon;
   at least one generally transparent and unmarked upper plate member;
   a line drawing template positionable over said unmarked upper plate member(s) and having at least one linear groove aperture extending therethrough to act as a guide for the drawing of a corresponding line on a surface of said unmarked upper plate member(s); and
   said upper plate members being selectively and concomitantly juxtapositionable over the upper surface of said base plate so as to create and display at least one moire pattern;
   wherein said radially extending lines and said partial lines become progressively wider as they extend outwardly toward the outer circumferential edge of the array.

* * * * *